United States Patent [19]
Kaneda et al.

[11] Patent Number: 5,187,585
[45] Date of Patent: Feb. 16, 1993

[54] IMAGE SENSING APPARATUS WITH SETTABLE FOCUS DETECTION AREA

[75] Inventors: Kitahiro Kaneda, Kanagawa; Kunihiko Yamada, Tokyo; Akihiro Fujiwara, Kanagawa; Hirofumi Suda, Kanagawa; Masamichi Toyama, Kanagawa, all of Japan

[73] Assignee: Canon Kabushiki Kaisha, Tokyo, Japan

[21] Appl. No.: 904,881

[22] Filed: Jun. 25, 1992

Related U.S. Application Data
[63] Continuation of Ser. No. 563,500, Aug. 6, 1990.

[30] Foreign Application Priority Data
Aug. 19, 1989 [JP] Japan .................................. 1-213921

[51] Int. Cl.$^5$ ..................... H04N 5/232; H04N 5/225; H04N 5/238
[52] U.S. Cl. ................................... 358/227; 354/402; 354/430
[58] Field of Search ........... 358/227, 225, 209, 213.13, 358/213.19, 228, 909; 354/400, 402, 404, 406, 407, 408, 430, 405

[56] References Cited
U.S. PATENT DOCUMENTS

| | | | |
|---|---|---|---|
| 4,614,975 | 9/1986 | Kaite | 358/227 |
| 4,717,959 | 1/1988 | Isago | 358/227 |
| 4,730,201 | 3/1988 | Sasagaki | 354/400 |
| 4,816,858 | 3/1989 | Watanabe et al. | 354/400 |
| 4,841,325 | 6/1989 | Hoshino et al. | 354/400 |
| 4,853,789 | 8/1989 | Murashina et al. | 358/227 |
| 4,871,906 | 10/1989 | Ueda et al. | 358/227 |
| 4,872,058 | 10/1989 | Baba et al. | 358/227 |

*Primary Examiner*—James J. Groody
*Assistant Examiner*—Glenton B. Burgess
*Attorney, Agent, or Firm*—Robin, Blecker, Daley & Driscoll

[57] ABSTRACT

An automatic focusing device which is capable of movably setting a focus detecting area on an image sensing plane comprises a position detecting circuit which detects the position of a picture-taking object within the focus detecting area, a storage circuit which stores a plurality of object position data detected at different points of time by the position detecting circuit, a computing circuit which computes the moving position of the focus detecting area by smoothing the object position data stored by the storage circuit and object position data currently detected, and an area setting circuit which shifts the focus detecting area on the basis of the shifting position computed by the computing circuit.

36 Claims, 6 Drawing Sheets

F I G.1
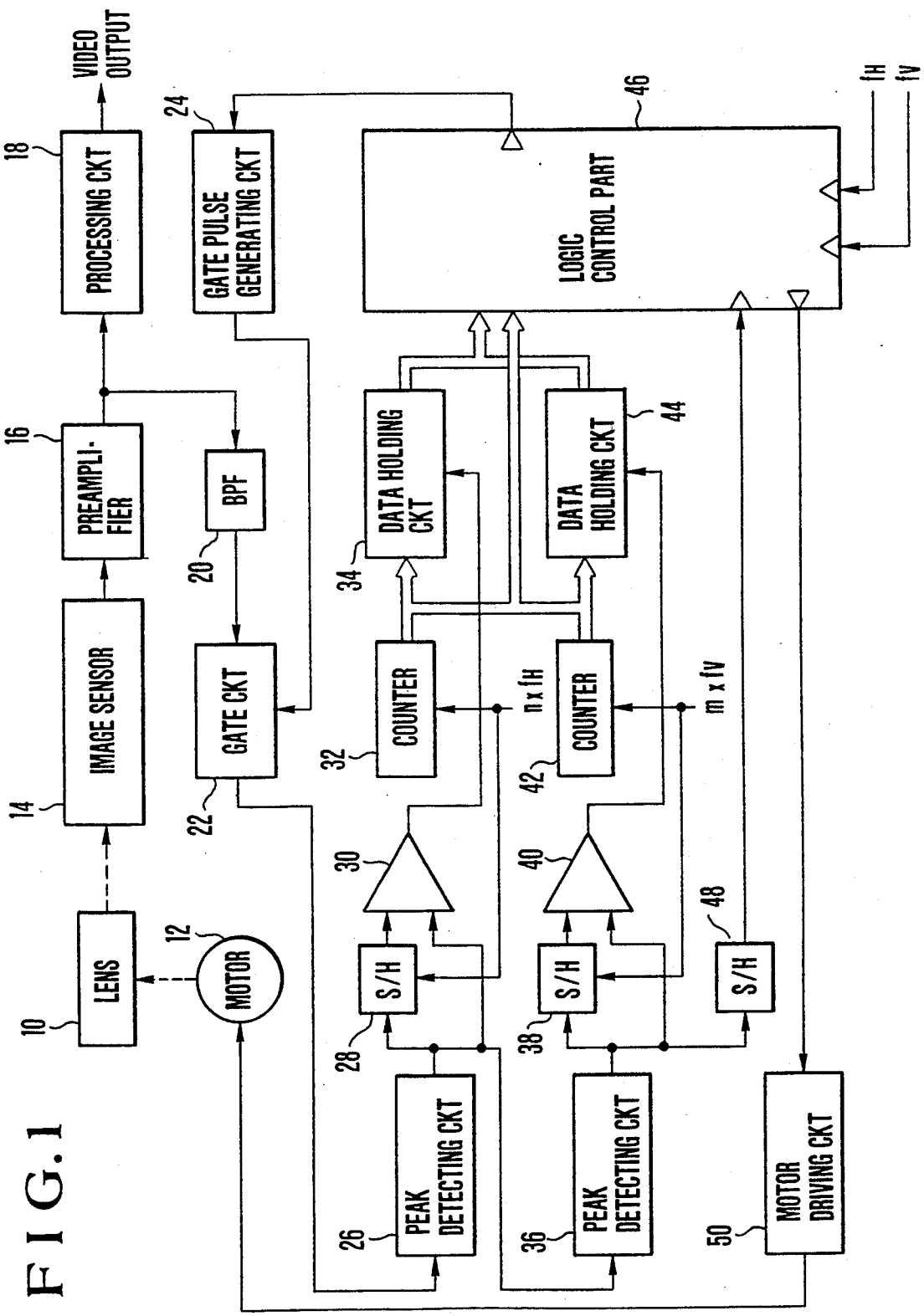

100: PEAK POSITION
101: FOCUS DETECTING AREA

IMAGE SENSING APPARATUS WITH SETTABLE FOCUS DETECTION AREA

This is a continuation application under 37 CFR 1.62 of prior application Ser. No. 563,500, filed Aug. 6, 1990.

BACKGROUND OF THE INVENTION

1. Field of the Invention

This invention relates to an automatic focusing device adapted for a video apparatus such as a video camera, an electronic still camera or the like.

2. Description of the Related Art

Methods of varied kinds have been known for the automatic focusing action of cameras. However, an apparatus of the kind having image sensing means for obtaining a video signal by photo-electrically converting the image of an object, such as a video camera or an electronic still camera, adopts a method whereby the definition of the object image is detected from a video signal and focus is adjusted to maximize the degree of image definition.

The apparatus of this kind is generally arranged to set a focus detecting area in a part of an image sensing plane. A focus detecting action is performed on the object image located within this area. It has recently been proposed to shift the focus detecting area while automatically tracing (tracking) the movement of an object in an effort to enhance the performance and to increase the functions of the apparatus. Such apparatuses have been disclosed, for example, in Japanese Laid-Open Patent Application No. SHO 60-249477.

Various methods also have been proposed for tracing the movement of the object. In one of them, for example, the moving position of the object is found by detecting a feature point of the object image within the focus detecting area. Then, the focus detecting area is newly set in such a way as to have the new position of the object approximately in the central part of the new area, so that a focusing action can be continuously performed on a moving object.

However, in the case of the apparatus of the above-stated kind, it is hardly possible to ensure a sufficient degree of detection accuracy as the focus detecting area must be adjusted to the moving position of the object for every field. In cases where the moving position of the object vigorously changes in particular, the focus detecting area also must be changed too much for adequate focus detection. Then, in a case where the focus detecting area is arranged to be displayed on an electronic viewfinder or the like, picture quality tends to degrade.

Previous patents and patent applications related to the present application include among others: U.S. Pat. No. 4,872,058 and U.S. patent applications Ser. Nos. 737,163 filed on May 23, 1985; 154,078 filed on Feb. 9, 1988; 237,511 filed on Aug. 26, 1988; and 240,915 filed on Sep. 6, 1988.

SUMMARY OF THE INVENTION

This invention is directed to the solution of the above-stated problem of the prior art.

It is, therefore, a first object of this invention to provide an image sensing apparatus which is capable of continuously and stably tracing a picture-taking object even when the image of the object irregularly moves on an image sensing plane.

It is a second object of the invention to provide an image sensing apparatus which is capable of causing a focus detecting area to stably trace the movement of a picture-taking object without being affected by noises on an image sensing plane.

It is a third object of the invention to provide an image sensing apparatus which is capable of smoothly and naturally shifting a focus detecting area on an image sensing image plane.

To attain this object, an image sensing apparatus which is arranged as a preferred embodiment of the invention to be capable of shifting a detecting area set on an image sensing plane for the purpose of detecting given information about an image sensing state obtained on the image plane comprises: detecting means for detecting the above-stated information from within the detecting area; computing means for computing information on the shifting position of the detecting area by smoothing a plurality of results of detection obtained at different points of time by the detecting means; and area setting means which controls the setting position of the detecting area on the basis of the information on the shifting position computed by the computing means.

It is a fourth object of the invention to provide an automatic focusing device which is capable of setting the position of a focus detecting area by smoothing a history of the movement and position of a picture-taking object and is capable of causing the focus detecting area to smoothly trace the image of the object even when the feature point of the object is unstably detected, so that the object image can be always stably positioned within the focus detecting area with the focus detecting area caused to trace the object.

It is a fifth object of the invention to provide an automatic focusing device which is of the kind continuously focusing on a picture-taking object by causing the position of a focus detecting area to trace the movement of the object, wherein: the position of the focus detecting area is set to trace the object by smoothing a history of changes taking place in the state, the feature point and the position of the object. This enables the device to always stably and accurately trace the object without lowering the object-following and focusing accuracy even in cases where the feature point of the object varies and where the focus detecting area is vigorously moved or vibrated as a result of vigorous changes taking place in the position of the object.

To attain that object, an automatic focusing device which is arranged according to this invention as a preferred embodiment thereof to be capable of shifting and setting a focus detecting area in a desired position on an image sensing plane comprises: position detecting means for detecting the position of the image of a picture-taking object obtained within the focus detecting area; storing means for storing information on a plurality of object positions detected at different points of time by the position detecting means; computing means for computing information on the shifting position of the focus detecting area by smoothing information on the past object position stored in the storing means and information on the latest object position; area setting means for shifting the set position of the focus detecting area on the basis of the information on the shifting position computed by the computing means.

It is a sixth object of the invention to provide an image sensing apparatus which is capable of making a smooth and stable display of focus detecting area, etc., on an image sensing plane without lowering the quality of picture even when the detecting area to be displayed vigorously and irregularly moves.

The above and further objects and features of the invention will become apparent from the following detailed description of embodiments thereof taken in connection with the accompanying drawings.

BRIEF DESCRIPTION OF THE DRAWINGS

FIG. 1 is a block diagram showing an automatic focusing device which is arranged according to this invention as an embodiment thereof.

DETAILED DESCRIPTION OF THE PREFERRED EMBODIMENTS

Figure 2:
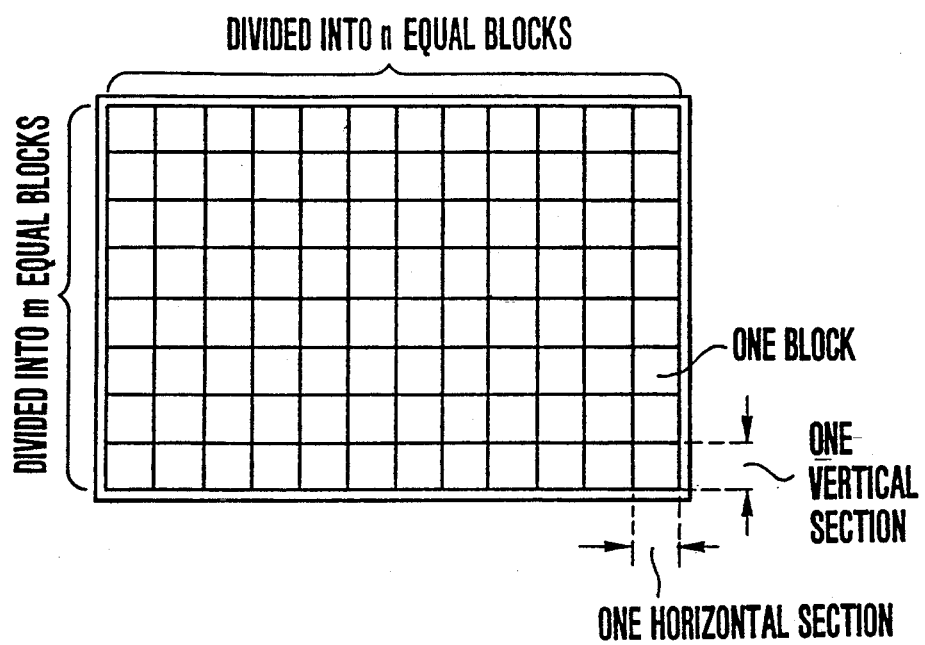
FIG. 2 shows the divided state of an image sensing plane.

The following describes the details of the automatic focusing device of this invention through an embodiment thereof with reference to the accompanying drawings:

FIG. 1 shows in a block diagram the invented automatic focusing device as applied to a video camera or the like. Referring to FIG. 1, a focusing lens 10 is arranged to be used for focusing. A motor 12 is arranged for driving the focusing lens 10 in the direction of the optical axis thereof. An image sensor 14 which is a CCD or the like is arranged to photo-electrically convert into a video signal the image of an object formed on its image sensing plane through the focusing lens 10 and to output the video signal. A preamplifier 16 is arranged to amplify up to a given level the video signal output from the image sensor 14. A processing circuit 18 is arranged to perform processes of varied kinds including a gamma correction process, a blanking process, a synchronizing signal adding process, etc., on the video signal output from the preamplifier 16 to convert it into a standard TV signal. The standard TV signal is then output from a video output terminal.

A band-pass filter (BPF) 20 is arranged to extract from the video signal output from the preamplifier 16 a high-frequency component necessary for focus detection. A gate circuit 22 is arranged to gate the output of the BPF 20 in such a way as to pass only a part of the video signal corresponding to a specifically designated area of the image sensing plane. A gate pulse generating circuit 24 is arranged to set the above-stated designated area within the image sensing plane by opening and closing the gate circuit 22. In accordance with the gate pulses of the gate pulse generating circuit 24, the gate circuit 22 passes only a part of one field amount of the video signal that corresponds to the designated area. By this, the embodiment is enabled to set a focus detecting area in any desired part of the image sensing plane from which the high-frequency component is to be extracted for focus detection.

A first peak detecting circuit 26 is arranged to detect the high-frequency component of the part of the video signal which corresponds to the inside of the focus detecting area and which is extracted by the gate circuit 22. The first peak detecting circuit 26 then holds and outputs the peak value of its input signal every time one horizontal scanning is performed in the focus detecting area. A sample-and-hold circuit 28 is arranged to sample and hold the output of the peak detecting circuit 26 for every one of horizontally divided blocks obtained by equally dividing the image sensing plane into an m number of blocks in the vertical direction and into an n number of blocks in the horizontal direction thereof as shown in FIG. 2. The sampling frequency to be used for the sample-and-hold (hereinafter referred to as S/H) circuit 28 is set at a clock frequency nfH which is n times as much as a horizontal synchronizing signal frequency fH and thus corresponds to the number of the horizontally divided blocks.

A comparison circuit 30 is arranged to compare the output of the peak detecting circuit 26 with the output of the S/H circuit 28 and to produce a pulse signal when any difference arises between them. For this purpose, the comparison circuit 30 makes computing comparison at a point of time which is later by a given length of time than the timing of sampling performed for every block by the S/H circuit 28. Therefore, until the output level of the gate circuit 22 reaches its peak, the output of the peak detecting circuit 26 changes before the comparing computation of the comparison circuit 30 after the sampling action of the S/H circuit 28. As a result, the two inputs of the comparison circuit 30 differ from each other. After a peak point, the output of the peak detecting circuit 26 becomes constant, and, accordingly the output of the S/H circuit 28 becomes equal thereto. The output of the comparison circuit 30 thus changes across the peak point in one horizontal scanning line to give a pulse signal.

A counter 32 is arranged to count the clock frequency nfH and to be cleared every time horizontal scanning begins. A data holding circuit 34 is arranged to hold the counted value of the counter 32 and to renew data held there in response to the pulse signal output from the comparison circuit 30. The value held by the data holding circuit 34 indicates one of the n number of horizontally divided blocks for which the output of the peak detecting circuit 26 changes (the peak of the output of the BPF 20). In other words, it indicates the location in the horizontal direction of one of block columns for which the peak value of the output of the BPF 20 is obtained.

A second peak detecting circuit 36 is arranged to receive the output of the first peak detecting circuit 26 and to hold the peak value of it obtained in the vertical direction within the focus detecting area. An S/H circuit 38 and a comparison circuit 40 are arranged, like the S/H circuit 28 and the comparison circuit 30, to form a signal indicating a point of time at which the output of the peak detecting circuit 36 changes and reaches its peak. The sampling frequency for the S/H circuit 38 is set at a clock frequency mfV which is m times as much as a vertical synchronizing signal frequency fV and thus corresponds to each of the m number of vertically divided blocks (see FIG. 2). The output of the peak detecting circuit 36 is thus arranged to be sampled for every one of the m number of blocks. Therefore, the output of the comparison circuit 40 indicates one of the vertically divided blocks for which the output level of the peak detecting circuit 36 has changed. In other words, it shows a peak arrival point in the vertical direction.

A counter 42 is arranged to count the clock frequency mfV and to be cleared every time vertical scanning begins. A data holding circuit 44 is arranged to hold the counted value of the counter 42 for the purpose of renewing, in response to the pulse signal output from the comparison circuit 40, the data held there up to that time. This held value indicates one of the m number of vertically divided blocks for which the output of the peak detecting circuit 36 has changed (to show the peak of the output of the BPF 20). In other words, the value held by the data holding circuit 44 indicates one of the vertical columns of blocks from which the peak value of the output of the BPF 20 is obtained.

The peak detecting circuits 26 and 36 are arranged to be cleared when vertical scanning begins.

A logic control part 46 consists of a microcomputer, etc., and is arranged to perform overall control for the operation of the invented automatic focusing device.

The logic control part 46 receives, for each field, the counted values of the horizontal and vertical counters 32 and 42; the horizontal position data obtained by the horizontal scanning data holding circuit 34; and the vertical position data obtained by the data holding circuit 44. Then, the horizontal and vertical positions of the peak of the high-frequency component for the applicable field are determined. The logic control part 46 stores data of these horizontal and vertical positions of the peak points obtained for two fields preceding the current field. The peak position for the next field is predicted by performing a computing operation on the stored data of these positions together with the horizontal and vertical position data of the current field. This computing operation is performed by a combination of the so-called shift averaging method and an exponential averaging method.

The logic control part 46 supplies a control signal to the gate pulse generating circuit 24 for setting the focus detecting area in a position where the computed peak point obtained through the above-stated computing operation is located virtually in the center of the area. The gate pulse generating circuit 24 sends gate pulses to the gate circuit 22 in such a way as to cause the gate circuit 22 to pass a part of the video signal corresponding to the set focus detecting area. The focus detecting area thus can be set within the image sensing plane always in a position where the peak value is located always in the central part of the focus detecting area.

The horizontal synchronizing frequency fH and the vertical synchronizing frequency fV are supplied to the logic control part 46 for the purpose of controlling each of circuit elements in synchronism with the synchronizing signals of the TV signal. To accurately set the focus detecting area on the image sensing plane, the synchronizing signals are used as reference signals for accurately adjusting the gate pulse generating timing of the gate pulse generating circuit 24 to the timing of scanning in each direction.

Further, the output level of the peak detecting circuit 36 indicates focused degree of the object image formed within the image sensing plane and is used as a focus signal. An in-focus state is obtained when the focus signal is at a maximum level. Therefore, the output level of the peak detecting circuit 36 is sampled by the S/H circuit 48 according to the vertical synchronizing signal frequency. In other words, it is sampled for every field.

The output level thus sampled is supplied to the logic control part 46. Then, a motor driving circuit 50 is controlled to drive the focusing lens 10 in the direction in which the level of the focus signal increases. For this purpose, various focus adjusting control actions are performed including control over the rotating direction and speed and the rotation and stopping of the motor 12.

Figure 4:
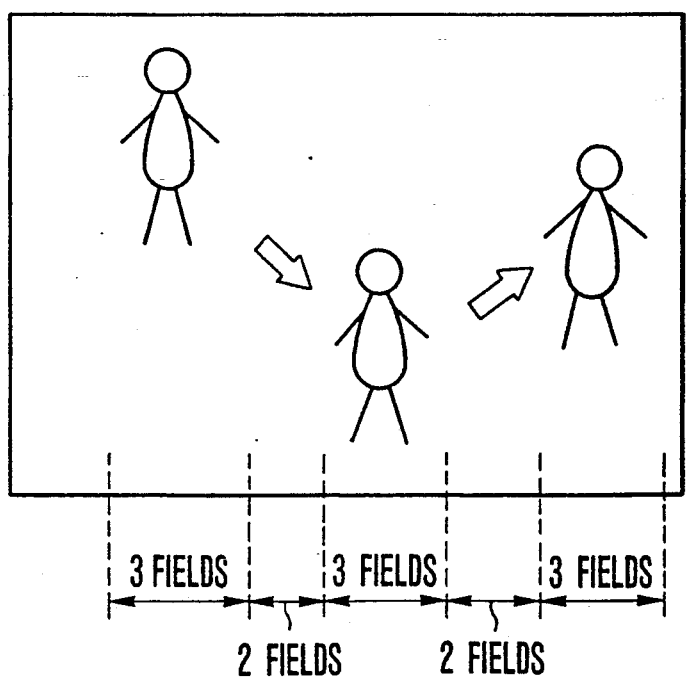
FIG. 4 shows a moving object.
Figure 5A:
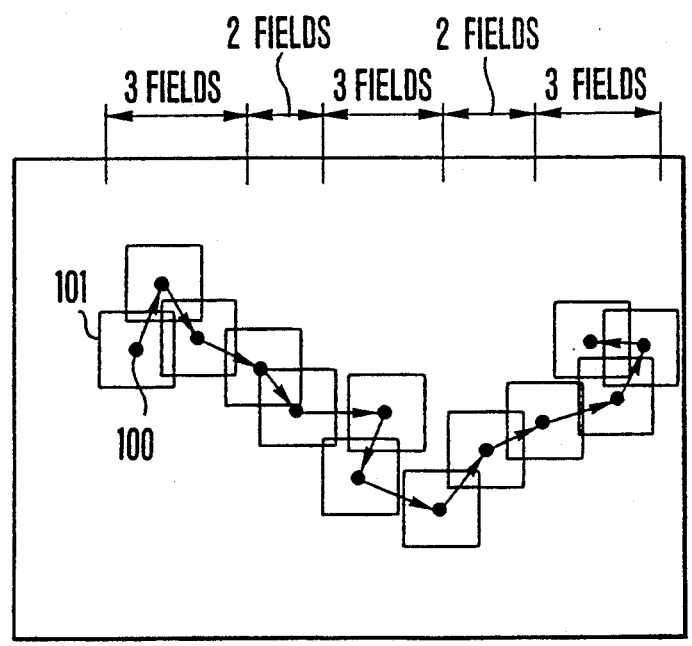
FIGS. 5(a) and 5(b) show the object tracing action of the invented device in comparison with that of the conventional device as seen on the image sensing plane.

The details of the computing operation of the logic control part 46 for obtaining the peak position data, i.e., for setting the position of the focus detecting area are as described below:

FIG. 4 shows a case where an object such as a person is moving. Sections provided below the drawing indicate the number of field periods which has elapsed accordingly as the object moves. FIG. 5(a) shows the shifting locus of the focus detecting area obtained by the conventional method, whereby: The horizontal and vertical positions of the peak point of the high-frequency component obtained for each field by the data holding circuits 34 and 44 are used as they are in setting the focus detecting area for every field, and the focus detecting area thus set is shifted to trace the image of the moving object such as a person. In FIG. 5(a), a reference numeral 100 denotes the horizontal and vertical positions of the peak point obtained for each field. A numeral 101 denotes the focus detecting area set within the image sensing plane. In the case of an object having a low degree of contrast like a person, many peak points of similar values are often detected from the high-frequency component. In such a case, the peak position vigorously fluctuates for every field even if the object is not moving. The movement of the object then causes more vigorous fluctuations.

Therefore, when the peak value is detected as a feature point of the object and the focus detecting area is allowed to trace the movement of the object according to the feature point, the position of the focus detecting area also vigorously fluctuates as shown in FIG. 5(a). As a result, it becomes impossible to stably trace the object and the object tracing accuracy also degrades accordingly. In cases where the focus detecting area is arranged to be displayed on a monitor screen such as an electronic viewfinder, the display of the focus detecting area excessively vibrates to seriously degrade the quality of picture.

In the case of this invention, the fluctuation in the position of the peak point within the object image is first removed by averaging the peak positions obtained for every three fields by obtaining the centroids of the coordinates of the horizontal and vertical positions for the three fields. Further, the peak position fluctuations resulting from the movement of the object are removed by the so-called exponential averaging method. The exponential averaging method is a kind of the shift averaging method. In accordance with this method, weight attached to data is reduced in a exponential functional manner to a greater degree accordingly as the sampled time of data is more precedent. It is an advantage of this method that the data can be smoothened without storing the past peak position coordinates. This can be expressed by the following formula:

$$Xn = \frac{N-1}{N} Xn-1 + \frac{1}{N} xn \quad (1)$$

wherein
N: number of times designated (number of fields)

xn: n-th data
Xn: the result of n-th round of averaging

Figure 6:
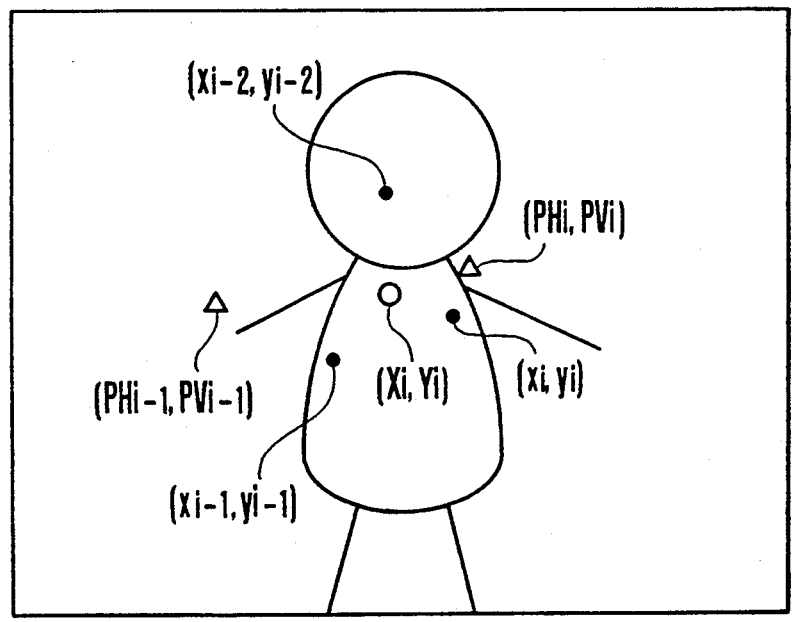
FIG. 6 shows the smoothing action of the invented device performed for smoothing a history of movement of an object.

Referring to FIG. 6, the above-stated computing operation is explained as follows: In FIG. 6, a reference symbol (xi, yi) denotes horizontal and vertical peak position coordinates of the current field. A symbol (xi−1, yi−1) denotes the peak position coordinates stored within the logic control part 46 for a field preceding the current field by one field period. A symbol (xi−2, yi−2) denotes the peak position coordinates stored for a field preceding the current field by two field periods.

The centroid position coordinates (Xi, Yi) of the above-stated three positions are first obtained by the following formulas:

$$Xi = \frac{xi + xi - 1 + xi - 2}{3} \quad (2\text{-}1)$$

$$Yi = \frac{yi + yi - 1 + yi - 2}{3} \quad (2\text{-}2)$$

Further, the computed peak position coordinates (PHi, PVi) to be used for setting the focus detecting area of the current field are obtained in the following manner on the basis of the above-stated coordinates (Xi, Yi), the peak position coordinates (PHi−1, PVi−1) which are computed by the exponential averaging method for the preceding field and stored in the memory of the logic control part 46 and Formula (1) above:

$$PHi = \frac{N-1}{N} PHi - 1 + \frac{1}{N} Xi \quad (3\text{-}1)$$

$$PVi = \frac{N-1}{N} PVi - 1 + \frac{1}{N} Yi \quad (3\text{-}2)$$

In Formulas (3-1) and (3-2), "N" represents the number of designating times used for Formula (1). However, in this instance, "N" indicates a weight attaching degree. The greater the value N, the more the sampled time of data is precedent. This gives a greater averaging effect. However, the delay time of the operation also increases. The value N is variable according to the aperture value, the focal length, the degree of focus, etc. of the camera, so that the object can be more adequately traced.

Figure 5B:
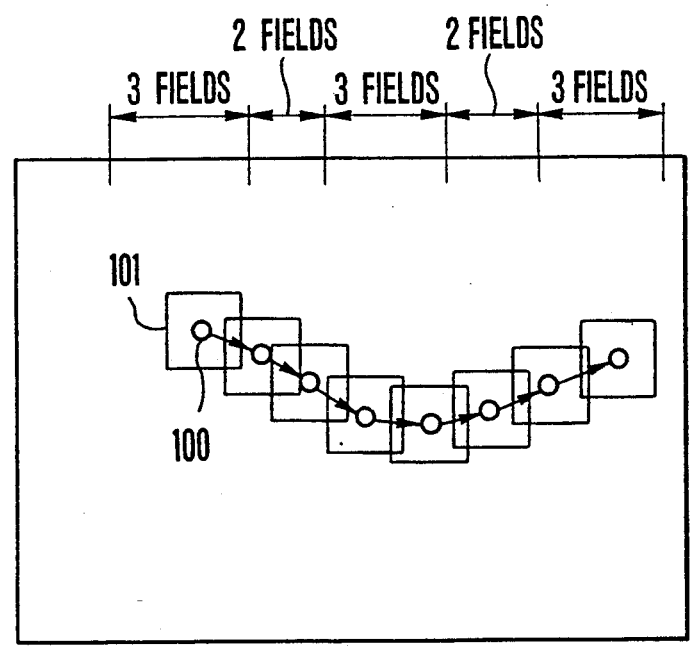

The focus detecting area is thus set by placing in the central part thereof the horizontal and vertical peak position coordinates (PHi, PVi) which are obtained in the above-stated manner. With the focus detecting area set in this manner, the focus detecting area can be smoothly and stably shifted while tracing the movement of the object as shown in FIG. 5(b) without such vigorous fluctuations that take place in the case of FIG. 5(a).

Figure 3:
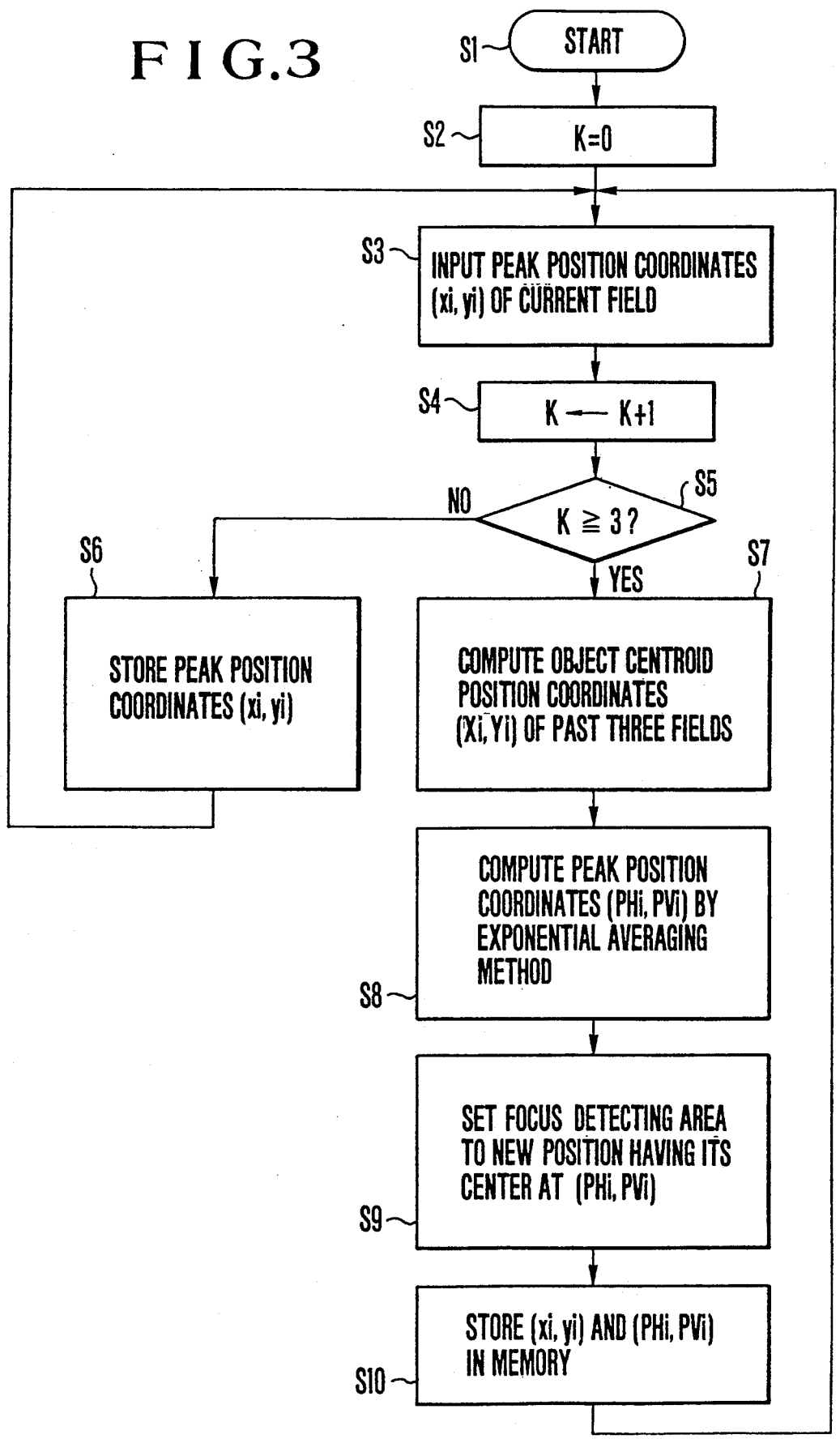
FIG. 3 is a flow chart showing the control operation of the automatic focusing device according to this invention.

FIG. 3 is a flow chart showing the control operation of the logic control circuit 46. Referring to FIG. 3, the flow of control operation begins at a step S1. At a step S2: The counter K which is arranged to detect the number of times for which initial setting data is taken in is cleared. At a step S3: The peak position coordinates (xi, yi) of the current field are taken in. At a step S4: The counted value of the counter K is incremented by one (+1). At a step S5: A check is made for the counted value of the counter K. At a step S6: The peak position coordinates (xi, yi) are stored in a memory which is disposed within the logic control part 46 until the counted value of the counter K is found to be "3" at the step S5. In other words, there is no data of the peak position coordinates for two consecutive preceding fields immediately after the start of the operation. Therefore, the peak position coordinates for these consecutive fields are taken in by means of the counter K.

With the counted value of the counter K having reached 3, the data of the peak position coordinates (xi−1, yi−1) of a previous field and that of the peak position coordinates (xi−2, yi−2) of a field preceding the previous field are stored in the memory. After that, the flow proceeds to a step S7. At the step S7: The object centroid position coordinates (Xi, Yi) of the past three fields are obtained by performing a computing operation according to the formulas (2-1) and (2-2) by using the peak position coordinates (xi, yi) of the current field together with the peak position coordinates of the two fields immediately preceding the current field.

At a step S8: A computing operation is performed according to the formulas (3-1) and (3-2) by using the exponential averaging method of Formula (1) and the object centroid position coordinates (Xi, Yi) to obtain the peak position coordinates (PHi, PVi). In performing computation by the formulas (3-1) and (3-2), the peak position coordinates (PHi−1, PVi−1) obtained last time must be used. However, no computed values are available for this purpose when this computing operation is performed for the first time. Therefore, the logic control part 4 is arranged to substitute, in that instance, the object centroid position coordinates (Xi, Yi) for the previous peak position coordinates (PHi−1, PVi−1).

After completion of the computation, the flow proceeds to a step S9. At the step S9: A focus detecting area is set in a position where the peak position coordinates (PHi, PVi) are located in the center of the area by controlling the gate pulse generating circuit 24. After renewal of the focus detection area, the flow comes to a step S10. At the step S10: The current peak position coordinates (xi, yi) and the peak position coordinates (PHi, PVi) are stored in the memory within the logic control part 46. The flow then comes back to the step 3 to repeat the above-stated computing operation all over again by newly taking in the peak position coordinates (xi, yi) within a next field image plane.

The flow of control operation described above enables the embodiment to stably keep the object image located within the focus detecting area without being affected by the fluctuations of the high frequency component of the image, the movement of the object and other noises which otherwise cause the position of the focus detecting area to fluctuate on the image plane. Therefore, the lens can be continuously focused on a moving object.

As indicated by the formulas (2-1) and (2-2), the embodiment described is arranged to compute the object centroid position coordinates by the method of obtaining the centroid coordinates from three peak detecting points. However, it is not always necessary to remove the fluctuations of the peak position by using the centroid position coordinates of the three points. The arrangement may be changed to more suitably trace the state of the object according to the variations, i.e., the degree of disturbance, taking place in the peak position coordinates.

In other words, the degree of peak position coordinate variations decreases accordingly as the disturbed degree of the image plane decreases. In cases where the image plane disturbance occurs to a small degree, therefore, a sufficient degree of accuracy is attainable by reducing the number of times for which the peak position is to be sampled. In such a case, the object tracing capability and the efficiency of use of the memory can be enhanced by reducing the number of sampling times.

The above-stated "degree of disturbance" is defined as follows: Generally, the degree of disturbance TNi is obtained by dividing the squared average speed of the variation component of a physical quantity by an average speed. The disturbed degree of the decrease of this is quantitatively expressed. With this definition applied to this invention, the degree of disturbance TNi can be expressed as follows:

$$TNi = \sqrt{\frac{(Xi - xi)^2 + (Yi - yi)^2}{2}} \bigg/ \sqrt{Xi^2 + Yi^2} \quad (4)$$

wherein Xi, Yi, xi and yi are the same as those described in the foregoing with reference to FIG. 6.

The object tracing capability and the memory using efficiency can be enhanced by constantly computing the degree of disturbance of horizontal and vertical peak position coordinates and by adjusting the number of sampling times (number of fields) of the formulas (2-1) and (2-2) to the result of computation.

Figure 7:
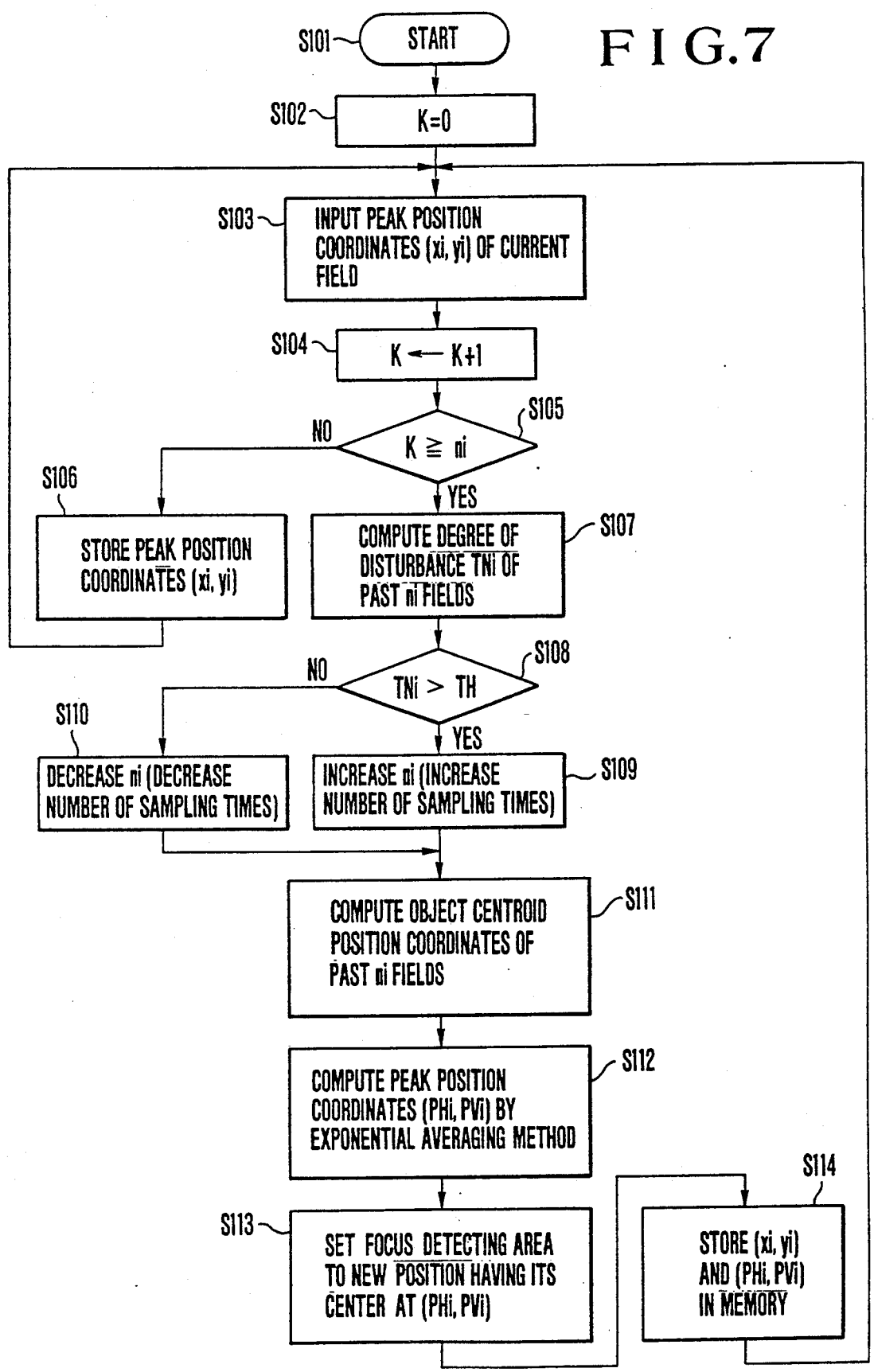
FIG. 7 is a flow chart showing the operation of another embodiment of the invention.

FIG. 7 shows in a flow chart the control operation of another embodiment of this invention which operates on the concept described above.

Referring to FIG. 7, the flow of the control operation begins at a step S101. At a step S102: The counter K which is arranged to detect the number of sampling times for which the initial setting data is taken in is cleared. At a step S103: The peak position coordinates (xi, yi) are taken in.

At a step S104: The counted value of the counter K is incremented by one. At a step S105: A check is made to find if the counted value of the counter K has reached a value ni. At a step S106: An ni−1 number of peak position coordinates are stored in a memory disposed within the logic control part 46 for a number of consecutive fields, because: No data of past peak position coordinates is available for two consecutive previous fields during a period immediately after the start of the control operation. During this period, therefore, the peak position coordinates is taken in for consecutive fields by using the above-stated counter K.

After the data of peak position coordinates for an ni−1 number of fields is stored with the counted value of the counter K having reached the value ni, the flow proceeds to a step S107. At the step S107: The degree of disturbance TNi is computed on the basis of the above-stated formula (4) from the object centroid coordinates (Xi, Yi) which are obtained from the peak position coordinates (xi, yi) of the current field and those of the past ni number of fields.

At a step S108: The degree of disturbance TNi is compared with a given threshold value TH. If the value TNi is larger than the value TH, the flow comes to a step S109. At the step S109: The number of sampling times (the number of fields) for sampling the peak position coordinates is increased by setting the value ni at a larger value and by carrying out a computing operation according to the formulas (2-1) and (2-2) which is provided for obtaining the above-stated centroid position. If the disturbance degree TNi is found not exceeding the threshold value TH at the step S108, the flow comes to a step S110. At the step S110: The number of sampling times is reduced by setting the value ni at a smaller value.

The arrangement described above enables the embodiment to accurately detect the moving positions of the picture-taking object by increasing the number of times for sampling the peak position when the feature point of the object varies to a great degree or when the object moves to a great degree. In cases where the feature point of the object does not vary much or where the object does not much move, on the other hand, the computing workload of the logic control part 46 is lightened by lessening the number of peak position sampling times.

The movement of the object thus can be accurately detected by increasing the number of peak position sampling times when either the feature point of the object greatly varies or the object moves to a great degree and by decreasing it to lighten the computing workload of the logic control part 46 when the feature point does not much vary or the object moves to a less degree.

As regards the increasing and decreasing ranges of the threshold value TH and the number of sampling times ni at the steps S108, S109 and S110, these ranges can be suitably selected according to the normal varying degree of the object, a permissible delay time, etc. After these steps, the flow comes to a step S111.

At the step S111: The object centroid position coordinates for the ni number of past fields are computed on the basis of the number of sampling times ni renewed at the above-stated steps S109 and S110. At a step S112: The peak position coordinates are computed and obtained in accordance with the exponential averaging method. At a step S113: The focus detecting area is set on the image sensing plane in a position where the peak position coordinates obtained at the step S112 is located in the central part of the area. At a step S114: The peak position coordinates (xi, yi) of the current field and the peak position coordinates (PHi, PVi) are stored in the memory disposed within the logic control part 46. The flow then comes back to the step S103 to repeat the above-stated computing operation all over again by newly taking in the peak position coordinates (xi, yi) for the next field image plane.

As described in the foregoing, the focus detecting area which is apposite to the state of the object can be set on the image sensing plane and the accuracy of the object tracing action can be enhanced by detecting the degree of disturbance of the image plane and by adjusting the number of times for which the peak position coordinates are sampled for computing the centroid position coordinates of the object. In addition to that, the efficiency of use of the memory of the logic control part 46 can be improved.

Further, in accordance with the above-stated method, the peak position can be computed with a sufficient degree of accuracy without adopting such an exponential averaging method as represented by the formulas (3-1) and (3-2) The computing operation thus can be simplified.

In cases where the degree of disturbance is very small, the object image can be traced solely in accordance with the exponential averaging method. The computing methods described are, therefore, adoptable in combination in varied manners.

As apparent from the foregoing description, the automatic focusing device of the kind continuously performing a focusing action by causing a focus detecting area to trace the movement of a picture-taking object is arranged according to this invention as follows: The position of the focus detecting area is set by smoothing a history of changes taking place in the object, the fluctuations of the feature point of the object and changes taking place in the position of the object. The object tracing accuracy and the focusing accuracy of the device are never affected and lowered by variations of the feature point of the object and vigorous movement or vibrations of the focus detection area resulting from vigorous changes of the position of the object. This arrangement, therefore, ensures a stable and accurate object tracing action of the embodiment.

Further, in cases where the focus detecting area must be displayed on a display screen, the invented device ensures, unlike the conventional device, a smooth and stable display as the focus detecting area never vigorously and irregularly moves to degrade the quality of the picture as displayed.

What is claimed is:

1. An image sensing apparatus capable of movably setting, on an image sensing plane, a detecting area for detecting predetermined information on an image sensing conditions, comprising:
   a) detecting means for detecting said predetermined information within said detecting area from an image signal produced by image sensing means, in a period of a predetermined time; and
   b) area setting means for computing information of a shifting position of said detecting area by attaching weights to a plurality of pieces of said predetermined information detected at different points of time by said detecting means and averaging said plurality of pieces of said predetermined information with said weights attached thereto and for controlling a setting position of said detecting area on the basis of said shifting position.

2. An apparatus according to claim 1, wherein said predetermined information is determined relatively to a focused condition of an object image formed on said image sensing plane, and wherein said detecting area is a focus detecting area.

3. An apparatus according to claim 2, wherein said detecting means is arranged to detect, from said image signal corresponding to said detecting area, a peak value of a high-frequency component which varies according to said focused condition and also to detect information on a peak position at which said peak value is detected on said image sensing plane.

4. An apparatus according to claim 3, wherein said area setting means includes storage means for storing at least information on said peak position among detection information detected by said detecting means for a plurality of fields which differ in time.

5. An apparatus according to claim 4, wherein said detecting means is arranged to detect said predetermined information in synchronism with a field period.

6. An apparatus according to claim 5, wherein said area setting means is arranged to correct information on said peak position by averaging weighted information on a plurality of said peak positions.

7. An image processing device, comprising:
   a) input means for inputting a plurality of information concerning a setting position of a detecting area on a screen; and
   b) area setting means for computing a position information by attaching weights to said plurality of information input by said input means and averaging said plurality of information with said weights attached thereto and for controlling said setting position of said detecting area on said screen.

8. An apparatus according to claim 6, wherein said area setting means is arranged to varyingly weight said information for averaging according to a lapse of time of detection thereof.

9. An apparatus according to claim 8, wherein said area setting means is arranged to set said detecting area on said image sensing plane in a position where information on said peak position is located substantially in the center of said detecting area.

10. An apparatus according to claim 1, wherein said detecting means is arranged to detect said predetermined information in synchronism with a field period, and wherein detected information relates to the position of said detecting area within said image sensing plane.

11. An apparatus according to claim 10, wherein said area setting means is arranged to correct information on the setting position of said detecting area by averaging a plurality of pieces of said weighted information detected at different points of time.

12. A device according to claim 7, wherein said screen is an image sensing plane of image sensing means and wherein said input means is arranged to input a predetermined signal component in an image signal output from said image sensing means.

13. An apparatus according to claim 11, wherein said area setting means computes the centroids of a plurality of positions and computes an exponential averaging the centroid information values.

14. An apparatus according to claim 13, wherein said area setting means is arranged to set said detecting area on said image sensing plane in a position where information on said peak position is located substantially in the center of said detecting area.

15. An image sensing apparatus having image sensing means for producing an image signal by photo-electrically converting an object image formed on an image sensing plane and being capable of movably setting an object detecting area on said image sensing plane, comprising:
   a) position detecting means for detecting the object position obtained within said detecting area; and
   b) control means for computing an information of a shifting position of said object detecting area by attaching weights to a plurality of pieces of information on the object position obtained by said position detecting means and averaging said plurality of pieces of said predetermined information with said weights attached thereto and for varying a setting position of said object detecting area on the basis of said shifting position.

16. An apparatus according to claim 15, wherein said position detecting means is arranged to detect said information on the object position in synchronism with a field period.

17. An apparatus according to claim 15, wherein said object position relates to a position where a peak value of a high-frequency component of said image signal is detected.

18. An apparatus according to claim 16, wherein said control means is arranged to average a plurality of weighted pieces of information on the object position obtained at different points of time.

19. An apparatus according to claim 18, wherein said control means is arranged to compute the coordinates of the setting position of said detecting area by a computing operation on the centroids of said plurality of pieces of information on the object position and an averaging operation on the computed centroids by varying the magnitude of weight attached to said computed centroids according to a lapse of time.

20. An object tracing device capable of movably setting an object tracing area on an image sensing plane of image sensing means, comprising:
a) object detecting means for detecting a feature point of an object image obtained on said image sensing plane and for outputting information on the position where said feature point is detected; and
b) area setting means for taking in and attaching weights to a plurality of pieces of said information on the position detected at different points of time by said object detecting means and averaging said plurality of pieces of said predetermined information with said weights attached thereto and for computing an information of a shifting position for setting said object tracing area and for controlling the setting position of said object tracing area on the basis of said shifting position.

21. A device according to claim 20, wherein said object detecting means is arranged to detect a feature point of the object from a part of an image signal produced by said image sensing means and corresponding to said object tracing area.

22. A device according to claim 21, wherein said feature point of the object is information on a peak value detection position where a peak value of a high-frequency component of said image signal is detected.

23. A device according to claim 22, wherein said object detecting means is arranged to detect said feature point of the object in synchronism with a field period.

24. A device according to claim 23, wherein said area setting means is arranged to perform a centroid computing operation on said plurality of pieces of information on the position detected by said object detecting means.

25. A device according to claim 24, wherein said area setting means is arranged to perform an averaging operation on centroid-computed information after weighting said centroid-computed information.

26. A device according to claim 25, wherein said averaging operation is performed by attaching weight to said centroid-computed information with said weight varied according to a lapse of time.

27. A device according to claims 20 or 26, wherein said area setting means is arranged to set said object detecting area in a position where said information on the position computed by said computing means is located in the center of said object tracing area.

28. An automatic focusing device capable of movably setting a focus detecting area on an image sensing plane, comprising:

a) position detecting means for detecting a position of an object within said focus detecting area;
b) storage means for storing a plurality of pieces of information on the position of the object detected at different points of time by said position detecting means; and
c) area setting means for computing information on a moving position of the object within said focus detecting area by attaching weights to the plurality of pieces of the information on the position of the object stored by said storage means and averaging said plurality of pieces of said predetermined information with said weights attached thereto and for controlling a setting position of said focus detecting area on the basis of said information on the moving position.

29. A device according to claim 28, wherein said position detecting means is arranged to detect, from an image signal corresponding to said focus detecting area, a peak value of a component of said image signal which varies with a focused condition of the object and to detect information on a peak detection position where said peak value is detected on said image sensing plane.

30. A device according to claim 29, wherein said component which varies according to the focused condition is a high-frequency component included in said image signal.

31. A device according to claim 30, wherein said storage means is arranged to store detection information detected by said detecting means for a plurality of fields which differ in time.

32. A device according to claim 31, wherein said storage means is arranged to store at least information on the peak position among a plurality of pieces of said detection information detected by said position detecting means.

33. A device according to claim 32, wherein said area setting means is arranged to compute the moving position of said focus detecting area by averaging a weighted plurality of pieces of information on the peak position stored by said storage means.

34. A device according to claim 12, wherein said detecting means is a focus detecting area.

35. A device according to claim 33, wherein said area setting means is arranged to carry out said averaging operation by varyingly attaching said weight to said plurality of pieces of information on the peak position according to a lapse of time.

36. A device according to claims 28 or 35, wherein said area setting means is arranged to set said detecting area on said image sensing plane in a position where said information on the peak position is located substantially in the center of said detecting area.

* * * * *